US008588324B2

(12) United States Patent  
Mondal et al.

(10) Patent No.: US 8,588,324 B2
(45) Date of Patent: Nov. 19, 2013

(54) PRECODING FOR COORDINATED MULTI-POINT JOINT TRANSMISSION

(75) Inventors: Bishwarup Mondal, Schaumburg, IL (US); Timothy A. Thomas, Palatine, IL (US); Eugene Visotsky, Buffalo Grove, IL (US)

(73) Assignee: Nokia Siemens Networks Oy, Espoo (FI)

( * ) Notice: Subject to any disclaimer, the term of this patent is extended or adjusted under 35 U.S.C. 154(b) by 80 days.

(21) Appl. No.: 13/275,470

(22) Filed: Oct. 18, 2011

(65) Prior Publication Data

US 2013/0094604 A1    Apr. 18, 2013

(51) Int. Cl.
*H04B 7/02*           (2006.01)
(52) U.S. Cl.
USPC ........... 375/267; 375/260; 375/295; 375/299; 375/340; 375/347; 455/101; 455/132; 455/500; 455/562.1; 370/252; 370/328; 370/334
(58) Field of Classification Search
USPC ......... 375/267, 259, 340, 260, 295, 299, 347; 370/252, 328, 334; 455/101, 132, 500, 455/562.1
See application file for complete search history.

(56) References Cited

U.S. PATENT DOCUMENTS

2012/0099470 A1*  4/2012  Li et al. ................... 370/252
2013/0010880 A1*  1/2013  Koivisto et al. ........... 375/259

OTHER PUBLICATIONS

"System Performance of JP-CoMP in Homogeneous Networks with RRHs", NTT DOCOMO, 3GPP TSG RAN WG1 Meeting #65, R1-111637, May 2011, 9 pgs.
"Further Phase-1 Evaluations of Joint Transmission and DCS", Motorola Mobility, 3GPP TSG RAN1 #65, R1-111600, May 2011, 8 pgs.
"$3^{rd}$ Generation Partnership Project; Technical Specification Group Radio Access Network; Evolved Universal Terrestrial Radio Access (E-UTRA); Physical Channel and Modulation (Release 10), Section 6.3.4", 3GPP TYS 36.211 V10.2.0, Jun. 2011, 16 pgs.
Alcatel-Lucent Shanghai Bell et al: "Multipoint CSI Feedback"; 3GPP Draft; R1-113318_Final, 3rd Generation Partnership Project (3GPP), Mobile Competence Centre; 650, Route des Lucioles; F-06921 Sophia-Antipolis Cedex; France; vol. RAN WG1, No. Zhuhai; 20111010, Oct. 7, 2011, XP050538611, [retrieved on Oct. 7, 2011], Chapter 3; p. 2.
Alcatel-Lucent Shanghai Bell et al: "Considerations on CSI feedback enhancements for high-priority antenna configurations" 3GPP Draft; R1-112420 Considerations on CSI Feedback enhancements for high-priority antenna Configurations_clean; 3rd Generation Partnership Project (3GPP), Mobile Competence Centre; 650, Route des Lucioles; F-06921 Sophia-Antipolis Cedex; France; vol. RAN WG1, No. Athens, Greece; 20110822, Aug. 18, 2011, XP050537814, [retrieved on Aug. 18, 2011]; Chapter3.1 and 4; pp. 2-4.

(Continued)

*Primary Examiner* — Leon Flores
(74) *Attorney, Agent, or Firm* — Harrington & Smith (57) ABSTRACT

The specification and drawings present a new method, apparatus and software related product (e.g., a computer readable memory) for implementing precoding for a coordinated multi-point joint transmission in LTE wireless systems using a specific product structure for a multi-point precoding matrix with designed and/or specified usage of multi-point codebooks for generating spatial data stream between a UE having multiple antennas and a plurality of cells.

17 Claims, 5 Drawing Sheets

(56) References Cited

OTHER PUBLICATIONS

Nokia Siemens Networks et al: "Further DL CoMP phase1 simulation results"; 3GPP Draft; R1-111276, 3rd Generation Partnership Project (3GPP), Mobile Competence Centre; 650, Route des Lucioles; F-06921 Sophia-Antipolis Cedex; France; vol. RAN WG1, No. Barcelona, Spain; 20110509, Apr. 15, 2011, XP050490959, [retrieved on Apr. 15, 2011] Chapter 4; p. 3.

* cited by examiner

PRECODING FOR COORDINATED MULTI-POINT JOINT TRANSMISSION

TECHNICAL FIELD

The exemplary and non-limiting embodiments of this invention relate generally to wireless communications and more specifically to precoding for a coordinated multi-point joint transmission in wireless systems (e.g., LTE systems).

BACKGROUND ART

The following abbreviations that may be found in the specification and/or the drawing figures are defined as follows:

| | |
|---|---|
| CB | Coordinated Beamforming |
| CDM | Code Division Multiplexing |
| C/I | Carrier-to-Interference Power Ratio |
| CoMP | Coordinated Multi-point |
| CQI | Channel Quality Indicator |
| CS | Coordinated Scheduling |
| CSI | Channel State Information |
| DCS | Dynamic Cell Selection |
| DL | Downlink |
| DPS | Dynamic Point Selection |
| E-UTRA | Evolved Universal Terrestrial Radio Access |
| eNB | Evolved Node B/Base Station in an E-UTRAN System |
| E-UTRAN | Evolved UTRAN (LTE) |
| FDM | Frequency Division Multiplexing |
| ITU | International Telecommunication Union |
| JT | Joint Transmission |
| LOS | Line-of-sight |
| LTE | Long Term Evolution |
| LTE-A | Long Term Evolution Advanced |
| MIMO | Multiple Input Multiple Output |
| PRB | Physical Resource Block |
| PDCCH | Physical Downlink Control Channel |
| PDSCH | Physical Downlink Shared Channel |
| PMI | Precoding Matrix Index |
| PUCCH | Physical Uplink Control Channel |
| PUSCH | Physical Uplink Shared Channel |
| RB | Resource Block |
| RI | Rank Index |
| RAN | Radio Access Network |
| Rx | Reception, Receiver |
| SNR | Signal-to-Noise Ratio |
| SRS | sounding reference signal |
| TDM | Time Division Multiplexing |
| Tx | Transmission, Transmitter |
| UE | User Equipment |
| UL | Uplink |
| UTRAN | Universal Terrestrial Radio Access Network |

Coordinated Multi-Point (CoMP) transmission is currently being investigated in 3GPP RAN documents, e.g., see R1-111637 ("System Performance of JP-CoMP in Homogeneous Networks with RRHs", 3GPP TSG RAN WG1 Meeting #65, Barcelona, Spain, May 9-13, 2011), and R1-111600 ("Further Phase-1 Evaluation of Joint Transmission and DCS Schemes", 3GPP TSG RAN WG1 Meeting #65, Barcelona, Spain, May 9-13, 2011).

Figure 1:
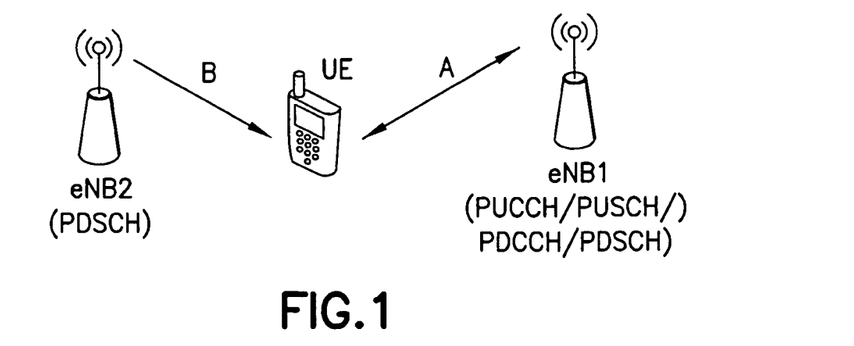
FIG. 1 is a diagram showing one coordinated multi-point scenario: the UE is communicating with eNB1 using UL control channel (PUCCH), UL data channel (PUSCH) and DL control (PDCCH) channels, the UE can receive a transmission on a shared channel (PDSCH) from eNB1 and eNB2.

The motivation for downlink (DL) CoMP is to allow fast coordination among different transmission points to improve a throughput performance. To enable closed-loop transmission from multiple transmission points to a given UE, channel state information for multiple radio links needs to be measured by the UE and sent to the network using the uplink control channel (PUCCH) or the uplink data channel (PUSCH). To simplify presentation a UE and two eNBs are considered, as shown in FIG. 1.

The UE communicates with eNB1 through a radio link A using uplink channels PUCCH and PUSCH and downlink channel PDCCH. In the case of the CoMP transmission the UE can receive a joint transmission using PDSCH from eNB1 through the link A and from eNB2 through a link B.

Figure 2:
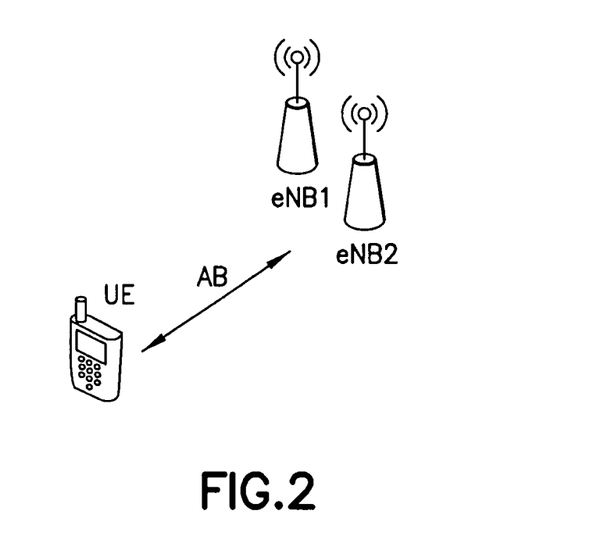
FIG. 2 is a diagram of a schematic representation of a multi-point link from eNB1 and eNB2 to a UE for practicing exemplary embodiments of the invention.

Each of these links may contain multiple transmit/multiple receive antennas and for simplicity it is assumed the UE has 2 receive antennas, and eNB1 and eNB2 having $N_{TA}$, $N_{TB}$ transmit antennas. Then the radio links A and B define $N_{TA} \times 2$ and $N_{TB} \times 2$ channels, respectively. In addition to these links we can also consider a multi-point link from the eNB1 and eNB2 to UE as shown in FIG. 2 and further discussed below. The link AB may create $(N_{TA}+N_{TB}) \times 2$ channels.

In a CoMP scenario the UE can perform channel state information (CSI) measurements for the links A, B, AB and send the measurements to the eNB1 via the PUCCH or PUSCH. The measurement and signaling needed for serving cell CSI feedback (e.g., link A in FIG. 1) already exist in RAN1 specifications referenced above. This includes Precoding Matrix Index (PMI)/Channel Quality Indicator (CQI)/Rank Index (RI) feedback for codebook based precoding and CQI feedback for SRS based precoding. The PMI indicates an index out of a codebook of transmit matrices which the eNB should use to transmit to the UE, the CQI provides information for the eNB to determine the best modulation and coding rate for the UE, and the RI is an indication of the number of data streams (i.e., a rank) that the UE can support.

Coordinated scheduling and beamforming (CS/CB) and dynamic point selection (DPS) are CoMP techniques where the PDSCH transmission for a UE specific resource block (RB) is from one transmission point. Therefore CS/CB and DPS techniques are agnostic to spatial channel information between two or more transmission points. In such cases a natural extension of the serving cell CSI feedback mechanism is possible where a single cell CSI feedback can be supported for non-serving cells (e.g. the link B in this example).

Two approaches have been recently proposed for implementing the CoMP transmission.

The first approach involves Hierarchical PMI feedback (R1-111637, "System Performance of JP-CoMP in Homogeneous Networks with RRHs", 3GPP TSG RAN WG1 Meeting #65, Barcelona, Spain, May 9-13, 2011). This technique has been proposed by multiple companies where an inter-point codebook (essentially a quantized phase difference between the eNB1 and eNB2) has been used. This implies that a PMI for the radio link A can be combined with a PMI for the radio link B by an inter-point codebook to generate a PMI for the multi-point radio link AB. It is however not clear whether and how the design handles ranks greater than one and whether orthonormality is guaranteed for rank-2 and higher disparate precoders for the link AB.

The second approach involves Non-Hierarchical PMI feedback (R1-111600, "Further Phase-1 Evaluation of Joint Transmission and DCS Schemes", 3GPP TSG RAN WG1 Meeting #65, Barcelona, Spain, May 9-13, 2011). In this approach a single joint PMI is used for multi-point radio link AB in addition to a single cell PMI for radio link A. The advantage here is that the ranks can be different for the radio links A and AB and there is compression of PMI information by using a joint PMI. This approach, however, is not easily scalable to an increase in the number of transmission points and is not flexible in handling different numbers of transmit antennas for different transmission points.

Joint transmission (JT) is a CoMP technique where multiple transmission points transmit a UE specific RB on the PDSCH. Therefore JT requires knowledge of spatial information between transmission points. This means that cell CSI feedback methods do not naturally extend to the case of JT where spatial information is needed for the link AB shown in FIG. 2. Therefore there is a need to define simple feedback strategies for multi-point spatial channel information feedback.

SUMMARY

According to a first aspect of the invention, a method comprises: receiving a data stream by a precoder of a device engaged in a coordinated multi-point joint transmission involving links between a user equipment having multiple receive antennas and a plurality of transmission points; and precoding the data stream to form a spatial data stream signal using a multi-point precoding matrix for one multi-point link between the user equipment and the plurality of transmission points where the multi-point precoding matrix is given by a multiplication of at least two matrices: a first matrix constructed from single point precoding matrices for the plurality of transmission points and an inter-point precoding matrix for the plurality of transmission points determined using predefined rules, wherein a rank of the multi-point precoding matrix is larger than one.

According to a second aspect of the invention, an apparatus comprises: a processing system comprising at least one processor and a memory storing a set of computer instructions, in which the processing system is arranged to cause the apparatus to: receive a data stream by a precoder of a device engaged in a coordinated multi-point joint transmission involving links between a user equipment having multiple receive antennas and a plurality of transmission points; and precode the data stream to form a spatial data stream signal using a multi-point precoding matrix for one multi-point link between the user equipment and the plurality of transmission points where the multi-point precoding matrix is given by a multiplication of at least two matrices: a first matrix constructed from single point precoding matrices for the plurality of transmission points and an inter-point precoding matrix for the plurality of transmission points determined using predefined rules, wherein a rank of the multi-point precoding matrix is larger than one.

According to a third aspect of the invention, a non-transitory computer readable memory encoded with a computer program comprising computer readable instructions recorded thereon for execution a method which comprises: receiving a data stream by a precoder of a device engaged in a coordinated multi-point joint transmission involving links between a user equipment having multiple receive antennas and a plurality of transmission points; and precoding the data stream to form a spatial data stream signal using a multi-point precoding matrix for one multi-point link between the user equipment and the plurality of transmission points where the multi-point precoding matrix is given by a multiplication of at least two matrices: a first matrix constructed from single point precoding matrices for the plurality of transmission points and an inter-point precoding matrix for the plurality of transmission points determined using predefined rules, wherein a rank of the multi-point precoding matrix is larger than one.

According to a fourth aspect of the invention, a method comprises: providing at least one feedback tracking signal by a receiving device engaged in a coordinated multi-point joint transmission involving links between a user equipment having multiple receive antennas and a plurality of transmission points, wherein the at least one feedback tracking signal comprises information for defining a multi-point precoding matrix for one multi-point link between the user equipment and the plurality of transmission points and given by multiplication of at least two matrices: a first matrix constructed from single point precoding matrices for the plurality of transmission points and an inter-point precoding matrix for the plurality of transmission points determined using predefined rules, wherein a rank of the multi-point precoding matrix is larger than one.

According to a fifth aspect of the invention, an apparatus comprises: a processing system comprises at least one processor and a memory storing a set of computer instructions, in which the processing system is arranged to cause the apparatus to provide at least one feedback tracking signal by a receiving device engaged in a coordinated multi-point joint transmission involving links between a user equipment having multiple receive antennas and a plurality of transmission points, wherein the at least one feedback tracking signal comprises information for defining a multi-point precoding matrix for one multi-point link between the user equipment and the plurality of transmission points and given by multiplication of at least two matrices: a first matrix constructed from single point precoding matrices for the plurality of transmission points and an inter-point precoding matrix for the plurality of transmission points determined using predefined rules, wherein a rank of the multi-point precoding matrix is larger than one.

According to a sixth aspect of the invention, a non-transitory computer readable memory encoded with a computer program comprising computer readable instructions recorded thereon for execution a method comprises: providing at least one feedback tracking signal by a receiving device engaged in a coordinated multi-point joint transmission involving links between a user equipment having multiple receive antennas and a plurality of transmission points, wherein the at least one feedback tracking signal comprises information for defining a multi-point precoding matrix for one multi-point link between the user equipment and the plurality of transmission points and given by multiplication of at least two matrices: a first matrix constructed from single point precoding matrices for the plurality of transmission points and an inter-point precoding matrix for the plurality of transmission points determined using predefined rules, wherein a rank of the multi-point precoding matrix is larger than one.

According to a seventh aspect of the invention, a method comprises: receiving a data stream by a precoder of a device engaged in a coordinated multi-point joint transmission involving links between a user equipment having multiple receive antennas and a plurality of transmission points; and precoding the data stream to form a spatial data stream signal using a multi-point precoding matrix for one multi-point link between the user equipment and the plurality of transmission points, wherein the multi-point precoding matrix is constructed from single point precoding matrices for the plurality of transmission points determined using predefined rules, a rank of the multi-point precoding matrix is larger than one and the multi-point precoding matrix is orthogonal.

According to eighth aspect of the invention, a method comprises: providing at least one feedback tracking signal by a receiving device engaged in a coordinated multi-point joint transmission involving links between a user equipment having multiple receive antennas and a plurality of transmission points, wherein the at least one feedback tracking signal comprises information for defining a multi-point precoding matrix for one multi-point link between the user equipment and the plurality of transmission points, and wherein the multi-point precoding matrix is constructed from single point precoding matrices for the plurality of transmission points determined using predefined rules, a rank of the multi-point precoding matrix is larger than one and the multi-point precoding matrix is orthogonal.

BRIEF DESCRIPTION OF THE DRAWINGS

For a better understanding of the nature and objects of embodiments of the invention, reference is made to the following detailed description taken in conjunction with the following drawings, in which.

DETAILED DESCRIPTION

A new method, apparatus, and software related product (e.g., a computer readable memory) are presented for implementing precoding for a coordinated multi-point joint transmission in wireless systems such as LTE using a specific product structure for a multi-point precoding matrix with designed and/or specified usage of multi-point codebooks for generating spatial data streams between a UE having multiple antennas and a plurality of cells (or transmission points).

In the following the term "cell" may be used as equivalent to an eNB, so the terms "cell" and "cell eNB" are equivalent to "eNB". Also if, for example, an eNB1 forms a link A with the UE, it is equivalent to the UE being in communication with a "cell A". Similarly, if an eNB2 forms a link B with the UE, it is equivalent to the UE being in communication with a "cell B". Also terms "multi-cell", single cell", "cell" and "inter-cell" may be more generally interpreted as "multi-point", "single point" "point" and "inter-point". The eNBs (i.e., eNB1 and eNB2) may be completely separate physical eNBs which may be geographically separated (this configuration is known as inter-site CoMP) or the eNBs may refer to two sectors (e.g., sectors 1 and 2) within a larger eNB unit (which is known as intra-site CoMP).

In order for the user equipment to receive a coherent transmission from the two eNBs over link AB, the user equipment can feed back to at least one eNB (e.g., eNB1) the joint multi-point precoding matrix $W_{AB}$ which the eNBs should use in transmitting to the user equipment. In other words, the eNBs will use $W_{AB}$ to apply antenna-specific weightings to the data stream or streams destined for the particular user equipment. Note that it is also possible for the user equipment to receive a non-coherent transmission from the two eNBs over link AB by feeding back to at least one eNB the joint multi-point precoding matrix $W_{AB}$ which does not contain inter-point phase information. The multi-point precoding matrix $W_{AB}$ for one multi-point link (e.g., link AB in FIG. 2) between the user equipment and the plurality of cells (e.g., two cells eNB1 and eNB2 as shown in FIG. 2), according to an embodiment of the invention, may be expressed as follows:

$$W_{AB} = U_{AB} P_{AB} V_{AB} \quad (1),$$

where $W_{AB}$ is a multi-point precoding matrix for a plurality of cells, $U_{AB}$ is a first matrix constructed from multiple single cell precoding matrices (or a single point precoding matrices for a plurality of transmission points), $P_{AB}$ is a multi-link power allocation matrix (or a multi-point power allocation matrix for the plurality of transmission points) for the plurality of cells and $V_{AB}$ is an inter-cell precoding matrix (or an inter-point precoding matrix for the plurality of transmission points). $U_{AB}$, $P_{AB}$ and $V_{AB}$ may be determined using predefined rules (criteria), as further described herein. In one embodiment, a rank of the multi-point precoding matrix may be larger than one and is equal or larger than a rank of any of the single cell precoding matrices. In another embodiment the rank of the multi-point precoding matrix $W_{AB}$ may be equal to one while at least one of the single point precoding matrices contained in $U_{AB}$ has a rank greater than one (e.g., the rank may be equal two). In a further embodiment the matrix $W_{AB}$ may be orthonormal. Designing and/or specifying the usage of multi-point codebooks for defining the product structure $W_{AB}$ is further described below. The embodiments of the invention specifically relates to the feedback of spatial channel information. According to another embodiment, a simplified version of Equation 1 may be as follows:

$$W_{AB} = U_{AB} V_{AB}.$$

An exemplary embodiment is considered for multi-point codebook design for two transmission points (e.g., as shown in FIG. 2) and the UE with two receiving antennas. Cells eNB1 and eNB2 have $N_{TA}$ and $N_{TB}$ transmit antennas, respectively. In reference to FIGS. 1 and 2 for each of the radio links A, B and AB the rank (e.g., UE predicted rank) may be 1 or 2. However, the rank (e.g., UE predicted rank) for the link A in this example is lower than or equal to that of the link AB. Similarly the rank (e.g., UE predicted rank) for the link B in this example is lower than or equal to that of the link AB. This is expected since for the purposes of rank determination in this example the transmit power assumption for the link AB is two times that of the link A (or link B). In addition the interference power is lower for the link AB than that for the link A or link B. The rank information that is of interest is provided in Table 1 and Cases 1-5 are discussed below.

TABLE 1

Ranks of interest.

| Case | Rank - Link A | Rank - Link B | Rank - Link AB |
|------|---------------|---------------|----------------|
| 1 | 1 | 1 | 1 |
| 2 | 1 | 1 | 2 |
| 3 | 2 | 1 | 2 |
| 4 | 1 | 2 | 2 |
| 5 | 2 | 2 | 2 |

Case 1:

Let $w_A$ (size $N_{TA} \times 1$) and $w_B$ (size $N_{TB} \times 1$) be the rank-1 precoders selected for the links A and B respectively. Then the rank-1 precoder for the link AB may be given by $w_{AB} = U_{AB} P_{AB} v_{AB}$, where $$U_{AB} = \begin{bmatrix} w_A & 0 \\ 0 & w_B \end{bmatrix}, P_{AB} = \begin{bmatrix} p_A & 0 \\ 0 & p_B \end{bmatrix} \text{ and } v_{AB} = \frac{1}{\sqrt{2}} \begin{bmatrix} 1 \\ e^{j\phi} \end{bmatrix}.$$

$w_{AB}$ is of the size $(N_{TA} + N_{TB}) \times 1$, $U_{AB}$ is of the size $(N_{TA} + N_{TB}) \times 2$, $P_{AB}$ is of the size $2 \times 2$ and is of the size $2 \times 1$. The inter-point codebook is given by a codebook for $v_{AB}$. For $w_A$ and $w_B$ with $N_{TA}=N_{TB}=2$ (two transmit antennas), the rank-1 codebook for LTE can be reused. Examples of rank-1 and rank-2 codebooks which may be used for $w_A$ and $w_B$ with 2 transmit antennas ($N_{TA}=N_{TB}=2$) is shown in Table 2 below. Similarly the rank-1 codebook shown in Table 2 may be used for $v_{AB}$. An example of how $P_{AB}$ can be fed back to an eNB is to quantize the values of $p_A$ to some range (e.g., between 0.3 and 1.4) by B bits and then determine $p_B=\sqrt{2-p_A^2}$.

TABLE 2

Example of Codebooks for 2 antennas for rank-1 and rank-2.

| Codebook index | Rank 1 | Rank 2 |
|---|---|---|
| 0 | $\frac{1}{\sqrt{2}}\begin{bmatrix}1\\1\end{bmatrix}$ | $\frac{1}{\sqrt{2}}\begin{bmatrix}1&0\\0&1\end{bmatrix}$ |
| 1 | $\frac{1}{\sqrt{2}}\begin{bmatrix}1\\-1\end{bmatrix}$ | $\frac{1}{2}\begin{bmatrix}1&1\\1&-1\end{bmatrix}$ |
| 2 | $\frac{1}{\sqrt{2}}\begin{bmatrix}1\\j\end{bmatrix}$ | $\frac{1}{2}\begin{bmatrix}1&1\\j&-j\end{bmatrix}$ |
| 3 | $\frac{1}{\sqrt{2}}\begin{bmatrix}1\\-j\end{bmatrix}$ | — |

Case 2:

Let $w_A$ (size $N_{TA} \times 1$) and $w_B$ (size $N_{TB} \times 1$) be the rank-1 precoders selected for the links A and B respectively. Then the rank-2 precoder for the link AB may be given by $W_{AB}=U_{AB}P_{AB}V_{AB}$, where $$U_{AB} = \begin{bmatrix} w_A & 0 \\ 0 & w_B \end{bmatrix}, P_{AB} = \begin{bmatrix} p_A & 0 \\ 0 & p_B \end{bmatrix}$$

and $V_{AB}$ is a 2×2 unitary matrix. $W_{AB}$ is of the size $(N_{TA}+N_{TB})\times 2$, $U_{AB}$ is of the size $(N_{TA}+N_{TB})\times 2$, $P_{AB}$ is of size 2×2 and $V_{AB}$ is of size 2×2. The inter-point codebook in this case is given by a codebook for $V_{AB}$, where the rank-2 codebook (e.g., for two transmit antennas) for LTE can be reused for this case, e.g., from Table 2. In an alternative embodiment the inter-point codebook $V_{AB}$ and/or $P_{AB}$ may be assumed to be an identity. If the inter-point matrix $V_{AB}$ is identity then the resulting transmission and reception scheme may also be termed as non-coherent. Also for $w_A$ and $w_B$ with 2 transmit antennas ($N_{TA}=N_{TB}=2$), the rank-1 codebook for LTE can be reused, e.g., rank-1 codebook with 2 transmit antennas ($N_{TA}=N_{TB}=2$) as shown in Table 2 above. An example of how $P_{AB}$ can be fed back to an eNB is to quantize the values of $p_A$ to some range (e.g., between 0.3 and 1.4) by B bits and then determine $p_B=\sqrt{2-p_A^2}$.

It is further noted that the rank-1 throughput (using case 1 methodology above) may be compared with the rank-2 throughput (using Case 2 methodology), and rank-1 may be chosen if its throughput is better. The reason for this is that Case 1 may provide very low C/I (Carrier-to-Interference Power Ratio) compared to Case 2.

Cases 3, 4:

For case 3, let $w_A$ (size $N_{TA}\times 2$) and $w_B$ (size $N_{TB}\times 1$) be the rank-2 and rank-1 precoders selected for the links A and B respectively.

For case 4, let $w_A$ (size $N_{TA}\times 1$) and $w_B$ (size $N_{TB}\times 2$) be the rank-1 and rank-2 precoders selected for the links A and B respectively.

Then the rank-2 precoder for the link AB may be given by $W_{AB}=U_{AB}P_{AB}V_{AB}$, where $$U_{AB} = \begin{bmatrix} w_A & 0 \\ 0 & w_B \end{bmatrix}, P_{AB} = \begin{bmatrix} p_{A1} & 0 & 0 \\ 0 & p_{A2} & 0 \\ 0 & 0 & p_B \end{bmatrix}$$

and $V_{AB}$ is a 3×2 orthonormal (orthogonal) matrix ($V_{AB}^H V_{AB}=I$). $W_{AB}$ is of the size $(N_{TA}+N_{TB})\times 2$, $U_{AB}$ is of the size $(N_{TA}+N_{TB})\times 3$, $P_{AB}$ is of the size 3×3 and $V_{AB}$ is of the size 3×2. The inter-point codebook in this case is given by a codebook for $V_{AB}$. The codebook design for $V_{AB}$ may be the same as the design of a rank-2 codebook for 3 antenna ports. An example of a codebook for this case may be given (with $x=e^{(j2\pi/3)}$) as follows:

$$\Omega = \left(\frac{1}{\sqrt{3}}\right)\left\{\begin{bmatrix}1&1\\1&x\\1&x^*\end{bmatrix}, \begin{bmatrix}1&1\\x&x^*\\x^*&x\end{bmatrix}, \begin{bmatrix}1&1\\x^*&1\\x&1\end{bmatrix}, \begin{bmatrix}1&1\\x&x^*\\x&1\end{bmatrix}, \right. \quad (2)$$

$$\left. \begin{bmatrix}1&1\\x^*&1\\1&x^*\end{bmatrix}, \begin{bmatrix}1&1\\1&x\\x^*&x\end{bmatrix}, \begin{bmatrix}1&1\\x^*&x\\x^*&1\end{bmatrix}, \begin{bmatrix}1&1\\x&1\\1&x\end{bmatrix}\right\}.$$

Using the above example codebook (Equation 2) effectively repeats the codebook vector for the link which has a rank of one. To avoid the repetition, the following codebooks may be used:

for the Case 4 (link A has a rank of one and link B has a rank of two) the codebook may be designed as follows:

$$\Omega = \left\{\begin{bmatrix}0&d\\c&-d\\c&d\end{bmatrix}, \begin{bmatrix}0&-d\\c&-d\\c&d\end{bmatrix}, \begin{bmatrix}d&0\\d&-c\\d&c\end{bmatrix}, \begin{bmatrix}-d&0\\d&-c\\d&c\end{bmatrix},\right.$$

$$\left.\begin{bmatrix}0&d\\jc&-jd\\c&d\end{bmatrix}, \begin{bmatrix}0&-d\\jc&-jd\\c&d\end{bmatrix}, \begin{bmatrix}d&0\\jd&-jc\\d&c\end{bmatrix}, \begin{bmatrix}-d&0\\jd&-jc\\d&c\end{bmatrix}\right\},$$

and for the Case 3 (link A has a rank of one and link B has a rank of two) the codebook may be designed as follows:

$$\Omega = \left\{\begin{bmatrix}c&d\\c&-d\\0&d\end{bmatrix}, \begin{bmatrix}c&d\\c&-d\\0&-d\end{bmatrix}, \begin{bmatrix}d&c\\d&-c\\d&0\end{bmatrix}, \begin{bmatrix}d&c\\d&-c\\-d&0\end{bmatrix},\right.$$

$$\left.\begin{bmatrix}c&d\\jc&-jd\\0&d\end{bmatrix}, \begin{bmatrix}c&d\\jc&-jd\\0&-d\end{bmatrix}, \begin{bmatrix}d&c\\jd&-jc\\d&0\end{bmatrix}, \begin{bmatrix}d&c\\jd&-jc\\-d&0\end{bmatrix}\right\},$$

where $c=\sqrt{0.5}$ and $d=\sqrt{\frac{1}{3}}$.

An example of how $P_{AB}$ can be fed back to an eNB is to quantize the values of $p_{A1}$ and $p_{A2}$ to some range (e.g., between 0.3 and 1.4) by B bits each and then determine $p_B=\sqrt{3-p_{A1}^2-p_{A2}^2}$.

Case 5:

Let $w_A$ (size $N_{TA} \times 2$) and $W_B$ (size $N_{TB} \times 2$) be the rank-2 precoders selected for the links A and B respectively. Then the rank-2 precoder for the link AB may be given by $W_{AB} = U_{AB} P_{AB} V_{AB}$ where $$U_{AB} = \begin{bmatrix} w_A & 0 \\ 0 & w_B \end{bmatrix}, P_{AB} = \begin{bmatrix} p_{A1} & 0 & 0 & 0 \\ 0 & p_{A2} & 0 & 0 \\ 0 & 0 & p_{B1} & 0 \\ 0 & 0 & 0 & p_{B2} \end{bmatrix}$$

and $V_{AB}$ is a 4×2 orthonormal matrix ($V^H_{AB} V_{AB} = I$). $W_{AB}$ is of the size $(N_{TA}+N_{TB}) \times 2$, $U_{AB}$ is of the size $(N_{TA}+N_{TB}) \times 4$, $P_{AB}$ is of the size 4×4 and $V_{AB}$ is of size the 4×2. The inter-point codebook in this case is given by a codebook for $V_{AB}$. In one embodiment the inter-point codebook $V_{AB}$ has all equal-gain entries. Any rank-2 codebook using four transmitters may be used, for example the LTE codebook may be reused for this case, e.g., see Table 6.3.4.2.3-2 in 3GPP TS 36.211 "Physical Channel and Modulation". An example of how $P_{AB}$ can be fed back to an eNB is to quantize the values of $p_{A1}$, $p_{A2}$, and $p_{B1}$ to some range (e.g., between 0.3 and 1.4) by B bits each and then determine $p_{B2} = \sqrt{4 - p_{A1}^2 - p_{A2}^2 - p_{B1}^2}$.

In any of the above cases the UE may feed back a codebook index (i.e., PMI) for $w_A$, one for $w_B$, one (or more) for $P_{AB}$, and also one for $V_{AB}$. The UE may also feed back RIs for link A, link B, and link AB.

It is further noted that the above example (Cases 1-5) is for the case when the UE is receiving DL signals from 2 cells, but a similar approach may be used for the case when the user equipment is transmitting UL signals. Also, the technique disclosed herein can be expanded to more than 2 cells communicating with the user equipment.

Moreover, the embodiments described herein provides a number of novel features which include but are not limited to the following.

A product structure for multi-point feedback (Equation 1) may provide a methodology to incrementally add inter-point spatial information to multiple single cell spatial information to create a multi-point precoding matrix. The spatial information for links A and B may be used to create the spatial information for the multi-point link AB. This follows the natural progression of CoMP schemes from a single cell to a dynamic cell selection to JT-CoMP and is attractive from the point of incrementally adding complexity to the specifications.

Further, the proposed product structure (Equation 1) may support different feedback ranks for the different links (i.e., the ranks of the links A, B and AB can be different). The multi-point precoding matrix of rank-2 or higher from the product structure (e.g., see Equation 1) may form an orthonormal basis. This property holds for single cell precoding matrix codebook definitions in 3GPP TS 36.211 and would be natural to consider in the multi-point case as well.

Still further, the multi-point precoding matrix with product structure can reuse existing single cell precoding codebooks specified in 3GPP TS 36.211, as discussed herein. The multi-point precoding matrix may accommodate different codebook structures for the different transmission points (e.g., cell A may use a codebook optimized for a linear array and cell B may use a codebook designed for a circular array).

Yet further, the multi-point precoding matrix with product structure may accommodate different number of transmit antennas for different transmission points, and $N_{TA}$ may not be equal to $N_{TB}$. As pointed out above, the multi-point precoding matrix with product structure may be extended to more than two transmission points. For example, multi-point precoding for 4 transmission points each with 2Tx can be supported by using a 3GPP TS 36.211 codebook for 8 transmitters as an intercell codebook.

Furthermore, embodiments of the invention may include the following aspects in reference to the product structure $W_{AB} = U_{AB} P_{AB} V_{AB}$.

The time and/or frequency resolution of $U_{AB}$ and $V_{AB}$ feedback may or may not be equal, for example the inter-point precoding matrix $V_{AB}$ may be fed back with a higher time and/or frequency resolution than $U_{AB}$.

The time and frequency resolution of $U_{AB}$ and $V_{AB}$ feedback may be determined by higher layer signaling or dynamic DL control signaling. The periodicity and offset of $U_{AB}$ and $V_{AB}$ feedback may be determined by the higher layer signaling or dynamic DL control signaling.

Figure 5:
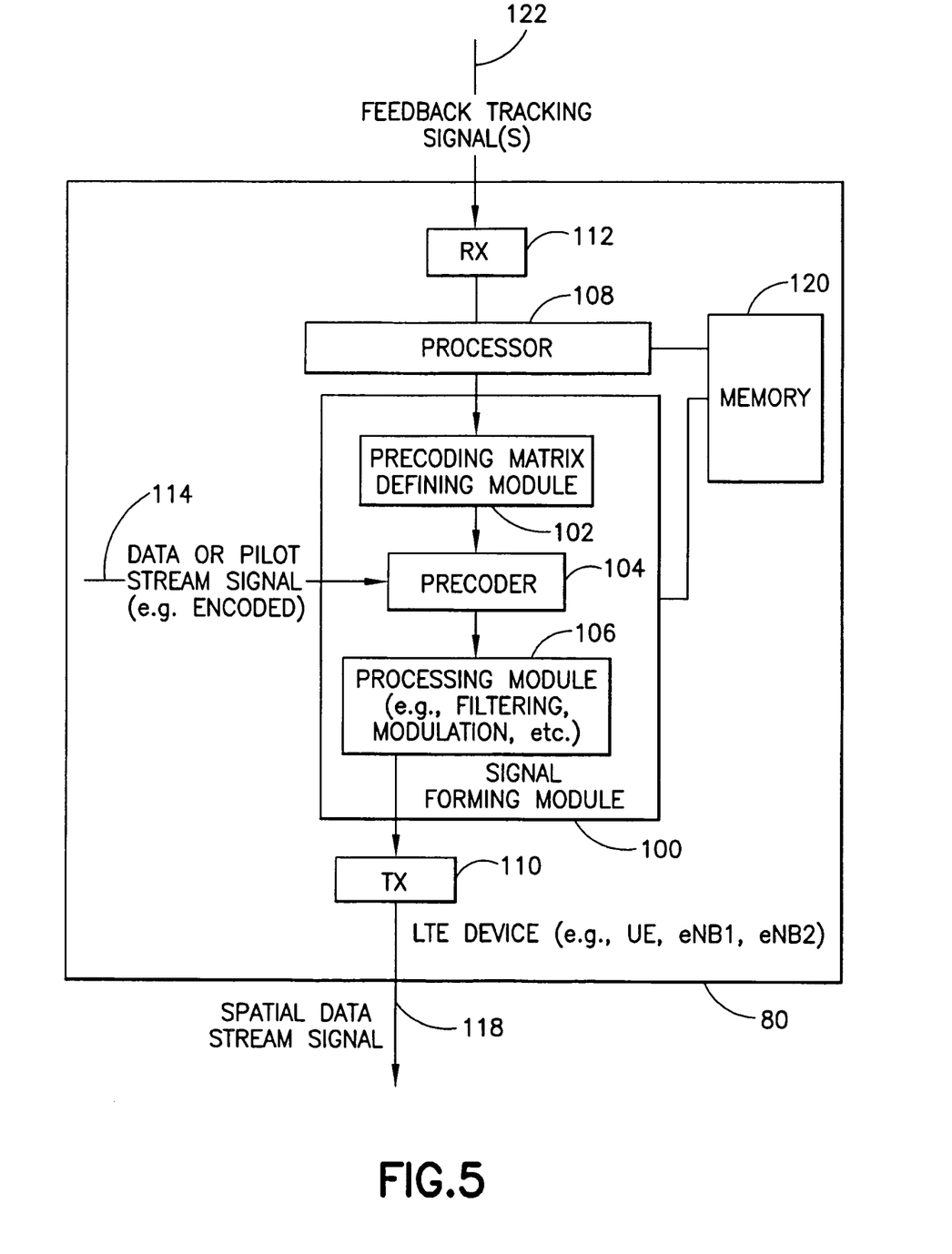
FIGS. 5 and 6 are block diagrams of an LTE wireless device for practicing exemplary embodiments of the invention.
Figure 6:
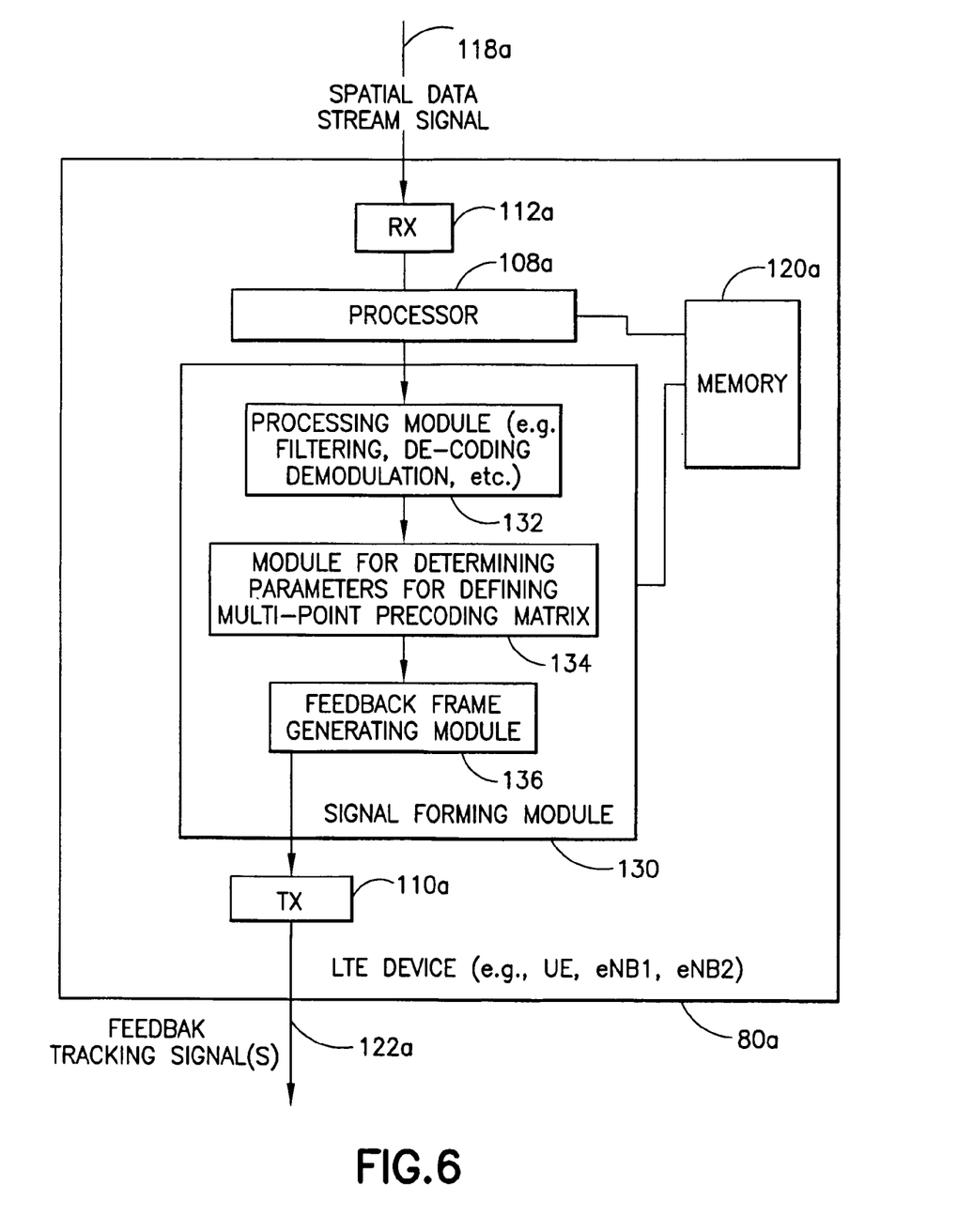

The codebooks for inter-point precoding matrix $V_{AB}$ may be sub-sampled to reduce the payload size of a feedback tracking signal/signals (see FIGS. 5 and 6). The codebooks for $V_{AB}$ may be sub-sampled jointly with that of $U_{AB}$.

A UE may autonomously choose to report $U_{AB}$ and/or $V_{AB}$ for a given feedback instance depending on channel conditions.

A codebook subset restriction using higher layer signaling may be applied to the inter-point codebook for $V_{AB}$.

The inter-point precoding matrix $V_{AB}$ may be fed back in an aperiodic manner using the PUSCH or a periodic manner using the PUCCH.

The determination of single cell precoding matrices (e.g., for the links A and B) and the inter-point precoding matrix $V_{AB}$ may be implemented jointly at the UE in the above example (cases 2-5). The UE may also determine the single cell precoding matrices first and use those to determine the inter-point precoding matrix.

The rank of the link A, link B, and/or link AB may be fed back (using feedback tracking signal(s), e.g., shown in FIG. 5) with the precoding matrix $V_{AB}$ and may be coded jointly, or may be fed back at a different interval.

The rank decision for the link AB by the UE may determine the codebook used for $V_{AB}$ (e.g., for the rank-1 case only a co-phase is signaled (see case 1) and for the rank-2 case $V_{AB}$ is a codebook of 2×2 matrices).

The power allocation matrix $P_{AB}$ may be determined by the UE and fed back or may be determined at the eNB(s). The UE may also assume an identity power allocation matrix if no power optimization is done. Power may be allocated on a per stream (layer) basis or per eNB or both.

There may be multiple methods of determining the multi-point precoding matrix $W_{AB}$ at the UE. The UE may jointly determine the multi-point precoding matrix with one or more single cell precoding matrices. The UE may also determine single cell precoding matrices first and use them to determine a multi-point precoding matrix. The same consideration may apply to rank and CQI determination.

In the case of retransmissions, the eNB(s) may need to modify the precoding matrix $W_{AB}$ in order to reduce rank, modify power or move to single cell transmission from joint transmissions. These decisions may depend on prior CQI reports from the UE or network conditions (like loading).

Figure 3A:
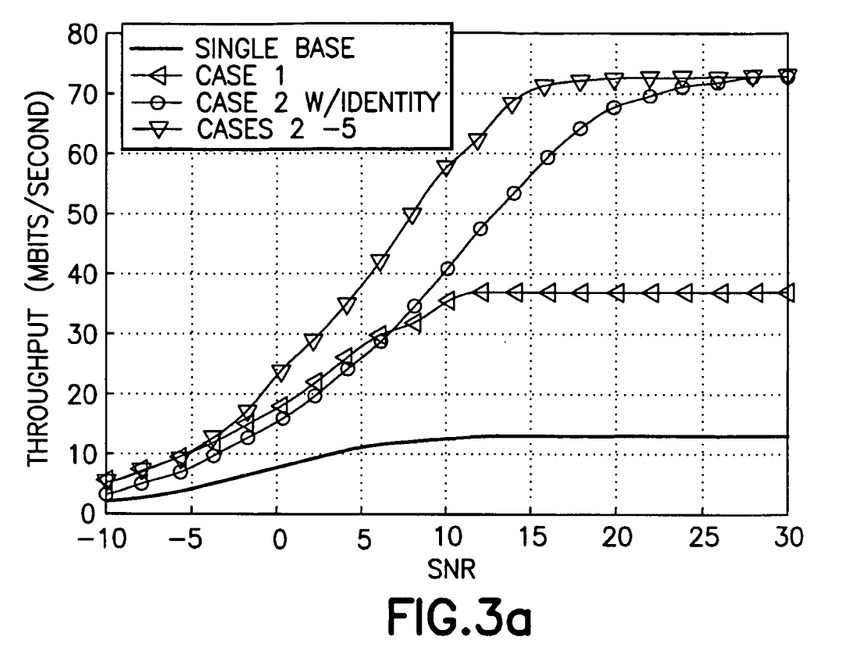
FIGS. 3*a*-3*b* are graphs showing dependence of a throughput on SNR for a 10 MHz LTE downlink simulated according to exemplary embodiments of the invention.
Figure 3B:
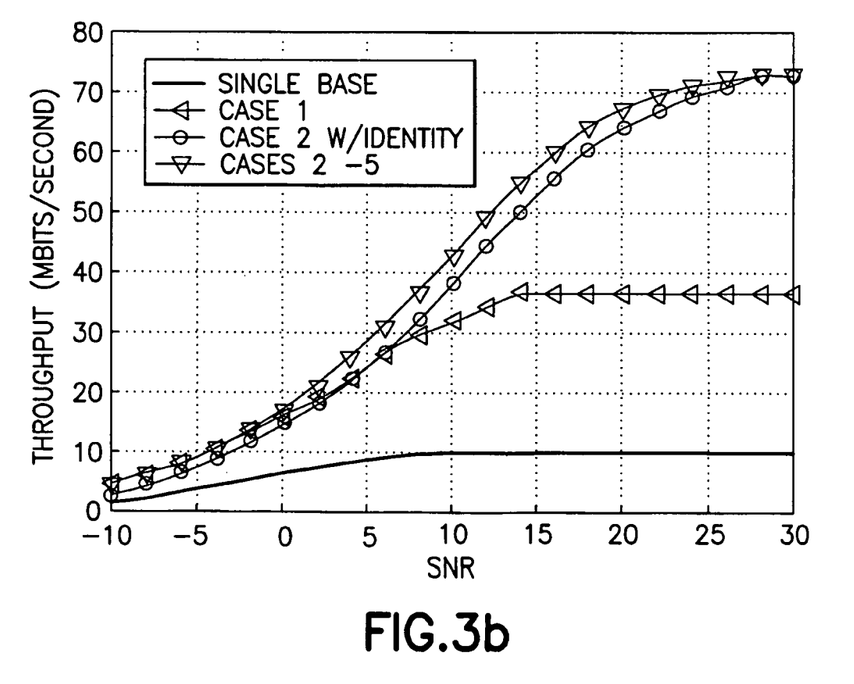

To further demonstrate the effectiveness of these embodiments, some simulation results are presented for a 10 MHz LTE downlink in FIGS. 3a and 3b showing dependence of a throughput on SNR. A UE is placed at equal-distances to two eNBs, signals from which are received at the same power by the UE. Each eNB has 4 antennas (cross-polarized, halfwavelength spacing) and the UE has two co-located cross-polarized antennas. The ITU UMi (urban micro) channel is simulated (both in line-of-sight (LOS) and non-LOS) and the UE speed is 3 km per hour. There is a 10 msec delay from a moment the feedback is determined to the time of the beamforming in the DL. An identity power allocation matrix is used. The CoMP results for the case 1 (prior art), for the case 2 with the $V_{AB}$ being identity matrix (one embodiment of the invention), and for the cases 2-5 (with $V_{AB}$ being unitary matrix for case 2) are compared to transmission results from a single eNB (prior art). Note that the UE in the single eNB case will have decreased C/I because the second (CoMP) eNB will be an interferer which is at the same strength as the desired eNB. The throughput results (without considering overhead) for the LOS UMi channel are presented in FIG. 3a and for the non-LOS UMi channel are presented in FIG. 3b. It is seen from FIGS. 3a and 3b that for both cases (LOS and non-LOS) different embodiments of the invention (cases 2-5) provide a substantial throughput gain over the prior art.

Figure 4A:
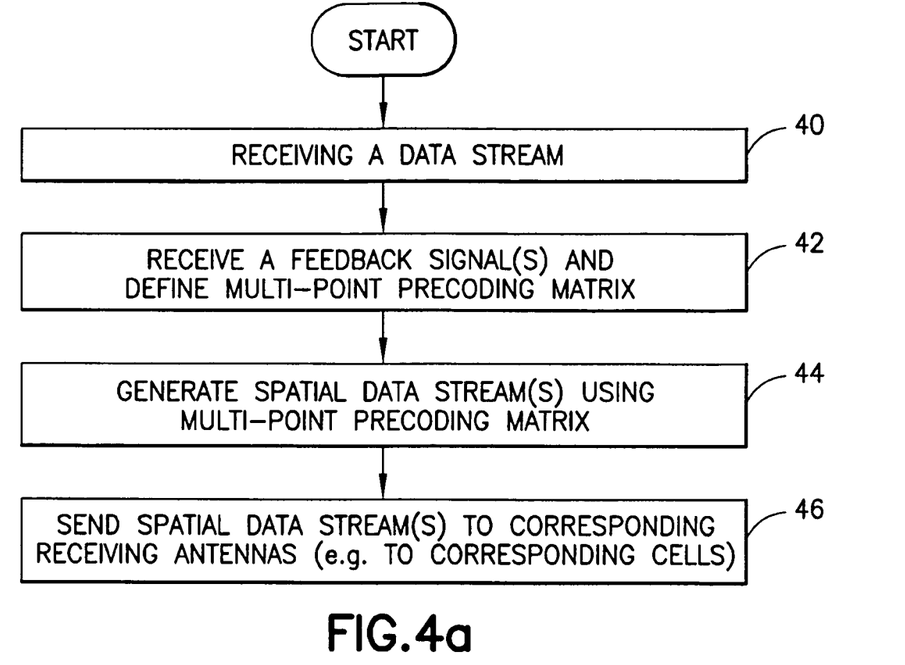
FIGS. 4*a*-4*b* are flow chart demonstrating precoding in coordinated multi-point joint transmission, according to an exemplary embodiment of the invention.

FIG. 4a shows an exemplary flow chart demonstrating precoding in coordinated multi-point joint transmission, according to an exemplary embodiment of the invention. It is noted that the order of steps shown in FIG. 4a is not absolutely required, so in principle, the various steps may be performed out of the illustrated order. Also certain steps may be skipped, different steps may be added or substituted, or selected steps or groups of steps may be performed in a separate application.

In a method according to the exemplary embodiment, as shown in FIG. 4a, in a first step 40, a precoder of a LTE wireless device (e.g., UE, eNB) receives a data stream (e.g., encoded data stream or a pilot stream). In a next step 42, the LTE wireless device receives a feedback tracking signal (or feedback tracking signals) and defines a multi-point precoding matrix (e.g., defined by Equation 1) as disclosed herein in exemplary embodiments of the invention. For example, the first matrix constructed from single point precoding matrices for the plurality of transmission points, the multi-point power allocation matrix for the plurality of transmission points and/or the inter-point precoding matrix for the plurality of transmission points may be determined, using one or more feedback tracking signals received from the user equipment or from one or more transmission points out of the plurality of transmission points engaged in the coordinated multi-point joint transmission, or using one or more rules of the predefined rules indicated in the one or more feedback tracking signals. Similarly, a codebook selection or a codebook indices selection for the first matrix constructed from single point precoding matrices for the plurality of transmission points, the multi-point power allocation matrix for the plurality of transmission points and/or the inter-point precoding matrix for the plurality of transmission points may be performed using one or more feedback tracking signals received from the user equipment or from one or more transmission points out of the plurality of transmission points engaged in the coordinated multi-point joint transmission, or using one or more rules of the predefined rules indicated in the one or more feedback tracking signals.

In a next step 44, the precoder of the LTE wireless device generates a spatial data stream from the data stream using the multi-point precoding matrix. Then in the final step 46, the LTE wireless device sends formed spatial data streams to corresponding receiver(s).

Figure 4B:
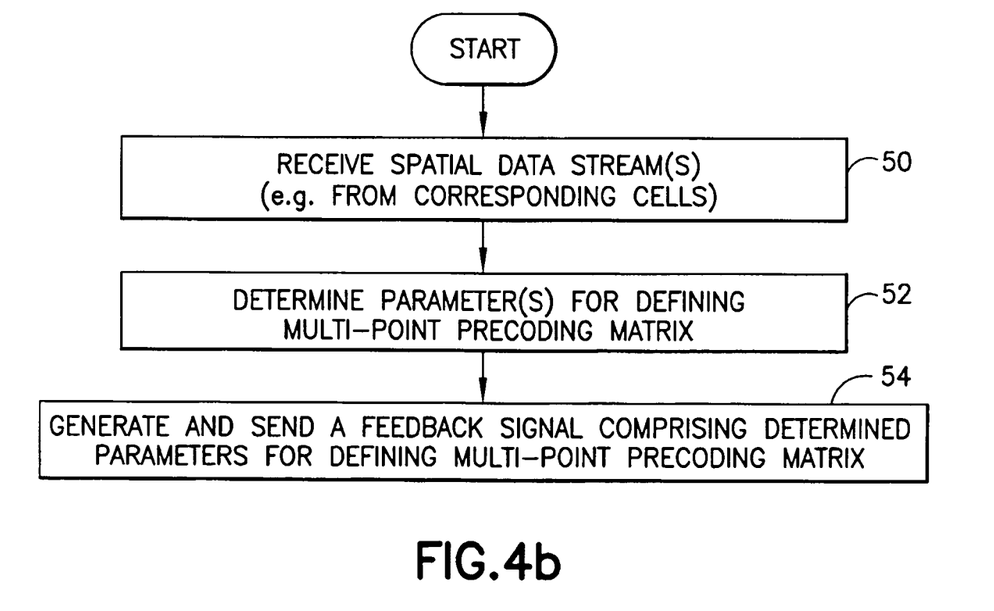

FIG. 4b shows another exemplary flow chart demonstrating a feedback aspect for forming precoding matrix in coordinated multi-point joint transmission, according to an exemplary embodiment of the invention. It is noted that the order of steps shown in FIG. 4b is not absolutely required, so in principle, the various steps may be performed out of the illustrated order. Also certain steps may be skipped, different steps may be added or substituted, or selected steps or groups of steps may be performed in a separate application.

In a method according to the exemplary embodiment, as shown in FIG. 4b, in a first step 50, a LTE wireless device (e.g., UE, eNB) receives a spatial data stream (e.g., from corresponding cells).

In a next step 52, the LTE wireless device determines one or more parameters for defining multi-point precoding matrix. These parameters may define one or more of (see Equation 1): a single cell precoding matrices for the plurality of cells (e.g., $w_A$, $w_B$ in cases 1-5 above) or at least one parameter for the single cell precoding matrices including at least one codeword selected from a codebook, or a rank; a multi-point power allocation matrix for the plurality of cells (e.g., $P_{AB}$) or at least one parameter for the multi-point power allocation matrix including channel state information based on a spatial data stream signal received by the receiving LTE wireless device; and an inter-point precoding matrix for the plurality of cells (e.g., $V_{AB}$) or at least one parameter of the inter-point precoding matrix including a codeword selected from a codebook, or a rank.

Then in the final step 54, the LTE wireless device generates and sends feedback (tracking) signal(s) comprising the parameters for defining multi-point precoding matrix to LTE devices(s) of the link(s) engaged in the coordinated multi-point joint transmission.

FIG. 5 shows an example of a simplified block diagram of a LTE wireless device 80 (e.g., UE, eNB, etc.) for practicing exemplary embodiments of the invention. The UE may be a mobile phone, a camera phone, a video phone, a portable device, a computer, or some other wireless devices. The LTE wireless device 80 comprises a signal forming module 100, at least one processor 108, at least one memory 120, at least one transmitter 110 and at least one receiver 112 for transmitting and receiving corresponding wireless signals (transmitting and receiving antennas are not shown in FIG. 5).

The signal forming module 100 comprises a precoding matrix defining module 102, a precoder 104, and a processing (e.g., filtering, modulation, etc.) module 106 for implementing exemplary embodiments of the invention demonstrated in FIGS. 2-4. For example, the precoding matrix defining module 102 may be used for implementing step 42 of FIG. 4a, e.g., defining the multi-point precoding matrix using feedback tracking signal(s) 122, the precoder 104 may be used for implementing step 44 of FIG. 4a for generating spatial data stream from the data stream using the multi-point precoding matrix, and the transmitter 112 may be used for implementing step 46 of FIG. 4a.

The transmitter 110 and the receiver 112 may be generally means for transmitting/receiving and may be implemented as a transceiver, or a structural equivalence (equivalent structure) thereof.

Various embodiments of the at least one memory 120 (e.g., computer readable memory) may include any data storage technology type which is suitable to the local technical environment, including but not limited to semiconductor based memory devices, magnetic memory devices and systems, optical memory devices and systems, fixed memory, removable memory, disc memory, flash memory, DRAM, SRAM, EEPROM and the like. Various embodiments of the processor 108 include but are not limited to general purpose computers, special purpose computers, microprocessors, digital signal processors (DSPs) and multi-core processors.

The signal forming module 100, or each of the modules 102, 104 and 106 may be implemented as an application computer program stored, e.g., in the at least one memory 120, but in general it may be implemented as a software, a firmware and/or a hardware module or a combination thereof. In particular, in the case of software or firmware, one embodiment may be implemented using a software related product such as a computer readable memory (e.g., a non-transitory computer readable memory), computer readable medium or a computer readable storage structure comprising computer readable instructions (e.g., program instructions) using a computer program code (i.e., the software or firmware) thereon to be executed by a computer processor.

Furthermore, the module 100, 102, 104 or 106 may be implemented as a separate block or may be combined with any other module/block of the module 100 or it may be split into several blocks according to their functionality. Moreover, it is noted that all or selected modules of the module 100 may be implemented using an integrated circuit (e.g., using an application specific integrated circuit, ASIC).

FIG. 6 shows an example of a simplified block diagram of a LTE wireless device 80a (e.g., UE, eNB, etc.) for practicing exemplary embodiments of the invention. The LTE wireless device 80a comprises a signal forming module 130, at least one processor 108a, at least one memory 120a, at least one transmitter 110a and at least one receiver 112a for transmitting and receiving corresponding wireless signals (transmitting and receiving antennas are not shown in FIG. 6).

The signal forming module 130 comprises a processing module 132 for processing (e.g., de-coding, filtering, demodulation, etc.) of the spatial data signal 118a received in step 50 of FIG. 4b, a module 134 for determining parameters for defining multi-point precoding matrix which is performed in step 52 of FIG. 4b, and a feedback frame generating module 136 for generating and sending a feedback signal 122a comprising the parameters for defining multi-point precoding matrix to LTE devices(s) of the link(s) engaged in the coordinated multi-point joint transmission, as performed in step 54 of FIG. 4b.

The transmitter 110a and the receiver 112a may be generally means for transmitting/receiving and may be implemented as a transceiver, or a structural equivalence (equivalent structure) thereof.

Various embodiments of the at least one memory 120a (e.g., computer readable memory) may include any data storage technology type which is suitable to the local technical environment, including but not limited to semiconductor based memory devices, magnetic memory devices and systems, optical memory devices and systems, fixed memory, removable memory, disc memory, flash memory, DRAM, SRAM, EEPROM and the like. Various embodiments of the processor 108a include but are not limited to general purpose computers, special purpose computers, microprocessors, digital signal processors (DSPs) and multi-core processors.

The signal forming module 130, or each of the modules 132, 134 and 136 may be implemented as an application computer program stored, e.g., in the at least one memory 120a, but in general it may be implemented as a software, a firmware and/or a hardware module or a combination thereof. In particular, in the case of software or firmware, one embodiment may be implemented using a software related product such as a computer readable memory (e.g., a non-transitory computer readable memory), computer readable medium or a computer readable storage structure comprising computer readable instructions (e.g., program instructions) using a computer program code (i.e., the software or firmware) thereon to be executed by a computer processor.

Furthermore, the module 130, 132, 134 or 136 may be implemented as a separate block or may be combined with any other module/block of the module 130 or it may be split into several blocks according to their functionality. Moreover, it is noted that all or selected modules of the module 130 may be implemented using an integrated circuit (e.g., using an application specific integrated circuit, ASIC).

Each LTE wireless device (e.g., UE, eNB) involved in coordinated multi-point joint transmission may comprise both, the module 100 shown in FIG. 5 and the module 130 shown in FIG. 6, to facilitate both receiving and transmitting functionalities for coordinated multi-point join transmission.

It is noted that various non-limiting embodiments described herein may be used separately, combined or selectively combined for specific applications.

Further, some of the various features of the above non-limiting embodiments may be used to advantage without the corresponding use of other described features. The foregoing description should therefore be considered as merely illustrative of the principles, teachings and exemplary embodiments of this invention, and not in limitation thereof.

It is to be understood that the above-described arrangements are only illustrative of the application of the principles of the present invention. Numerous modifications and alternative arrangements may be devised by those skilled in the art without departing from the scope of the invention, and the appended claims are intended to cover such modifications and arrangements.

What is claimed is:

1. A method comprising:
receiving a data stream by a precoder of a device engaged in a coordinated multi-point joint transmission involving links between a user equipment having multiple receive antennas and a plurality of transmission points; and
precoding the data stream to form a spatial data stream signal using a multi-point precoding matrix for one multi-point link between the user equipment and the plurality of transmission points where the multi-point precoding matrix is given by a multiplication of at least two matrices: a first matrix constructed from single point precoding matrices for the plurality of transmission points and an inter-point precoding matrix for the plurality of transmission points determined using predefined rules,
wherein a rank of the multi-point precoding matrix is larger than one, and
wherein said multi-point precoding matrix is orthonormal.

2. The method of claim 1, wherein the multi-point precoding matrix is given by a multiplication of three matrices: the first matrix constructed from the single point precoding matrices for the plurality of transmission points, a multi-point power allocation matrix for the plurality of transmission points, and the inter-point precoding matrix for the plurality of transmission points determined using the predefined rules.

3. The method of claim 2, wherein said plurality of transmission points correspond to two cells A and B and the multi-point precoding matrix for the one multi-point link is given by $W_{AB}=U_{AB}P_{AB}V_{AB}$ wherein $U_{AB}$ is the first matrix constructed from multiple single point precoding matrices for the cells A and B, $P_{AB}$ is the multi-point power allocation matrix involving cells A and B, and $V_{AB}$ is the inter-point precoding matrix for the cells A and B.

4. The method of claim 3, wherein the rank of the multi-point precoding matrix is two and the rank of the precoding matrices for the cells A and B is one or two.

5. The method of claim 3, wherein the rank of the multi-point precoding matrix is two, the rank of the single cell precoding matrix for one of the cells A and B is one and the rank of the precoding matrix for another of the cells A and B is two.

6. The method of claim 2, wherein one or more of the inter-point precoding matrix and the multi-point power allocation matrix for the plurality of transmission points are identity matrices.

7. The method of claim 2, wherein a codebook selection or codebook indices selection for one or more of: the first matrix constructed from the single point precoding matrices for the plurality of transmission points, the multi-point power allocation matrix for the plurality of transmission points and the inter-point precoding matrix for the plurality of transmission points is performed using one or more feedback tracking signals received from the user equipment or from one or more transmission points out of the plurality of transmission points engaged in the coordinated multi-point joint transmission, or using one or more rules of the predefined rules indicated in the one or more feedback tracking signals.

8. The method of claim 2, wherein one or more of: the first matrix constructed from the single point precoding matrices for the plurality of transmission points, the multi-point power allocation matrix for the plurality of transmission points and the inter-point precoding matrix for the plurality of transmission points are determined using one or more feedback tracking signals received from the user equipment or from one or more transmission points out of the plurality of transmission points engaged in the coordinated multi-point joint transmission, or using one or more rules of the predefined rules indicated in the one or more feedback tracking signals.

9. An apparatus comprising:
a processing system comprising at least one processor and a memory storing a set of computer instructions, in which the processing system is arranged to cause the apparatus to:
receive a data stream by a precoder of a device engaged in a coordinated multi-point joint transmission involving links between a user equipment having multiple receive antennas and a plurality of transmission points; and
precode the data stream to form a spatial data stream signal using a multi-point precoding matrix for one multi-point link between the user equipment and the plurality of transmission points where the multi-point precoding matrix is given by a multiplication of at least two matrices: a first matrix constructed from single point precoding matrices for the plurality of transmission points and an inter-point precoding matrix for the plurality of transmission points determined using predefined rules,
wherein a rank of the multi-point precoding matrix is larger than one, and
wherein said multi-point precoding matrix is orthonormal.

10. The apparatus of claim 9, wherein the multi-point precoding matrix is given by a multiplication of three matrices: the first matrix constructed from the single point precoding matrices for the plurality of transmission points, a multi-point power allocation matrix for the plurality of transmission points, and the inter-point precoding matrix for the plurality of transmission points determined using the predefined rules.

11. The apparatus of claim 10, wherein said plurality of transmission points correspond to two cells A and B and the multi-point precoding matrix for the one multi-point link is given by $W_{AB}=U_{AB}P_{AB}V_{AB}$ wherein $U_{AB}$ is the first matrix constructed from multiple single point precoding matrices for the cells A and B, $P_{AB}$ is the multi-point power allocation matrix involving cells A and B, and $V_{AB}$ is the inter-point precoding matrix for the cells A and B.

12. The apparatus of claim 11, wherein the rank of the multi-point precoding matrix is two and the rank of the precoding matrices for the cells A and B is one or two.

13. A method comprising:
providing at least one feedback tracking signal by a receiving device engaged in a coordinated multi-point joint transmission involving links between a user equipment having multiple receive antennas and a plurality of transmission points,
wherein the at least one feedback tracking signal comprises information for defining a multi-point precoding matrix for one multi-point link between the user equipment and the plurality of transmission points and given by multiplication of at least two matrices: a first matrix constructed from single point precoding matrices for the plurality of transmission points and an inter-point precoding matrix for the plurality of transmission points determined using predefined rules,
wherein a rank of the multi-point precoding matrix is larger than one, and
wherein said multi-point precoding matrix is orthonormal.

14. The method of claim 13, wherein the multi-point precoding matrix is given by a multiplication of three matrices: the first matrix constructed from the single point precoding matrices for the plurality of transmission points, a multi-point power allocation matrix for the plurality of transmission points, and the inter-point precoding matrix for the plurality of transmission points determined using the predefined rules.

15. The method of claim 14, wherein the information comprises one or more of:
the single point precoding matrices for the plurality of transmission points or at least one parameter for the single point precoding matrices including at least one index selected from or a subset of a codebook,
the multi-point power allocation matrix for the plurality of transmission points or at least one parameter for the multi-point power allocation matrix including channel state information based on a spatial data stream signal received by the receiving device, and
the inter-point precoding matrix for the plurality of transmission points or at least one parameter of the inter-point precoding matrix including at least one index selected from or a subset of a codebook.

16. An apparatus comprising:
a processing system comprising at least one processor and a memory storing a set of computer instructions, in which the processing system is arranged to cause the apparatus to:
provide at least one feedback tracking signal by a receiving device engaged in a coordinated multi-point joint transmission involving links between a user equipment having multiple receive antennas and a plurality of transmission points,
wherein the at least one feedback tracking signal comprises information for defining a multi-point precoding matrix for one multi-point link between the user equipment and the plurality of transmission points and given by multiplication of at least two matrices: a first matrix constructed from single point precoding matrices for the plurality of transmission points and an inter-point precoding matrix for the plurality of transmission points determined using predefined rules,
wherein a rank of the multi-point precoding matrix is larger than one, and
wherein said multi-point precoding matrix is orthonormal.

17. The apparatus of claim 16, wherein the multi-point precoding matrix is given by a multiplication of three matrices: the first matrix constructed from the single point precoding matrices for the plurality of transmission points, a multi-point power allocation matrix for the plurality of transmission points, and the inter-point precoding matrix for the plurality of transmission points determined using the predefined rules.

* * * * *